US 8,407,451 B2

(12) United States Patent
Meil et al.

(10) Patent No.: US 8,407,451 B2
(45) Date of Patent: Mar. 26, 2013

(54) METHOD AND APPARATUS FOR ENABLING RESOURCE ALLOCATION IDENTIFICATION AT THE INSTRUCTION LEVEL IN A PROCESSOR SYSTEM

(75) Inventors: Gavin Balfour Meil, Round Rock, TX (US); Steven Leonard Roberts, Cedar Park, TX (US); Christopher John Spandikow, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 154 days.

(21) Appl. No.: 11/671,508

(22) Filed: Feb. 6, 2007

(65) Prior Publication Data

US 2008/0189522 A1 Aug. 7, 2008

(51) Int. Cl.
*G06F 15/00* (2006.01)
*G06F 15/76* (2006.01)
(52) U.S. Cl. ............... 712/15; 712/26; 712/220; 712/13
(58) Field of Classification Search .................. 712/220, 712/28, 26
See application file for complete search history.

(56) References Cited

U.S. PATENT DOCUMENTS

| | | | |
|---|---|---|---|
| 6,567,897 B2 * | 5/2003 | Lee et al. ...................... 711/153 |
| 6,801,995 B1 * | 10/2004 | Alidina et al. ................. 712/210 |
| 7,490,221 B2 | 2/2009 | Evans |
| 2002/0083244 A1 * | 6/2002 | Hammarlund et al. ....... 710/107 |
| 2004/0044878 A1 * | 3/2004 | Evans et al. ...................... 712/34 |
| 2005/0138621 A1 * | 6/2005 | Clark et al. .................... 718/100 |
| 2006/0015772 A1 * | 1/2006 | Ang et al. .......................... 714/7 |
| 2007/0074011 A1 * | 3/2007 | Borkar et al. ................. 712/227 |

FOREIGN PATENT DOCUMENTS

KR 1020050057199 A 6/2005

OTHER PUBLICATIONS

IBM—Cell Broadband Engine Architecture, Version 1.0, pp. 1-319 (Aug. 2005).
Kahle—Introduction to the Cell Multiprocessor, IBM JRD (Jul. 2005).
Page—IBM's Cell Processor: Preview to Greatness?, (May 2005).
Hofstee—Power Efficient Processor Architecture and the Cell Processor, IEEE HPCA (Nov. 2005).
GSCHWIND "Synergistic Processing in Cell's Multicore Architecture" IEEE Computer Society, pp. 10-24 (2006).
Srinivasan "Cell Broadband Engine processor DMA enigenes: Part 1: The little engines that move data" downloaded from http://www.ibm.com/developerworks/library/pa-celldmas/ , pp. 1-13 (Sep. 6, 2005).
EPC Exam Report (Dec. 17, 2009).

\* cited by examiner

*Primary Examiner* — Eddie P Chan
*Assistant Examiner* — George Giroux
(74) *Attorney, Agent, or Firm* — Matt Talpis; Mark P Kahler

(57) ABSTRACT

An information handling system includes a processor with multiple hardware units that generate program application load, store, and I/O interface requests to system busses within the information handling system. The processor includes a resource allocation identifier (RAID) that links the processor hardware unit initiating a system bus request with a specific resource allocation group. The resource allocation group assigns a specific bandwidth allocation rate to the initiating processor. When a load, store, or I/O interface bus request reaches the I/O bus for execution, the resource allocation manager restricts the amount of bandwidth associated with each I/O request by assigning discrete amounts of bandwidth to each successive I/O requester. Successive stages of the instruction pipeline in the hardware unit contain the resource allocation identifiers (RAID) linked to the specific load, store, or I/O instruction.

13 Claims, 9 Drawing Sheets

FIG. 2

RESOURCE ALLOCATION MAP

| REQUESTORS | RAG NUMBER | RESOURCES MEMORY BANK | | | | | | | | I/O INTERFACES | | | |
|---|---|---|---|---|---|---|---|---|---|---|---|---|---|
| HARDWARE UNIT (HU) | | 1 | 2 | 3 | 4 | 5 | 6 | 7 | 8 | IOIF0 IN | IOIF0 OUT | IOIF1 IN | IOIF1 OUT |
| PPE 115 | 0 | 20% | | | | | | | | 10% | 15% | 15% | 10% |
| SPE-1 | 1 | 30% | | | | | | | | 20% | 10% | 20% | 10% |
| SPE-2 | | | | | | | | | | | | | |
| SPE-3 | | | | | | | | | | | | | |
| SPE-4 | | | | | | | | | | | | | |
| SPE-5 | 2 | 15% | | | | | | | | 15% | 20% | 10% | 30% |
| SPE-6 | | | | | | | | | | | | | |
| SPE-7 | 3 | 10% | | | | | | | | 15% | 25% | 10% | 15% |
| SPE-8 | | | | | | | | | | | | | |
| I/O CONTROLLER 170 | 0 1 2 3 | 10% | | | | | | | | 20% | 15% | 10% | 15% |

FIG. 7

FIFO STORE QUEUE
700

| RA | WIMG | SIZE | DATA | RAID BITS | |
|---|---|---|---|---|---|
| RA3 | 0101 | 4 BYTES | D3 | 00 (i.e. RAG0) | store-3 |
| RA2 | 1101 | 8 BYTES | D2 | 11 (i.e. RAG3) | store-2 |
| RA1 | 0110 | 2 BYTES | D1 | 01 (i.e. RAG1) | store-1 |

METHOD AND APPARATUS FOR ENABLING RESOURCE ALLOCATION IDENTIFICATION AT THE INSTRUCTION LEVEL IN A PROCESSOR SYSTEM

TECHNICAL FIELD OF THE INVENTION

The disclosures herein relate to information handling systems, and more particularly, to the efficient allocation of shared resources in information handling systems.

BACKGROUND

An information handling system (IHS) may include a processor system that employs multiple processors for processing, handling, communicating or otherwise manipulating information. A multi-core processor is one term that describes a processor system with multiple processors or cores integrated on a common integrated circuit. An IHS or processor system may concurrently support multiple operating systems. Moreover, multiple software program applications may execute within the processor system at the same time. For example, a processor system may execute a program application for virus detection while at the same time executing a program for calculating and sending graphics data to a display. A multi-processing environment is an environment in which multiple programs execute or run concurrently. Multi-processing environments are commonplace in conventional processor architectures.

A typical software program application in a processor system consumes memory addresses and input/output (I/O) resources as a normal process during program execution. Processor systems execute load and store operations that employ memory and/or I/O busses. Processor systems rely on the allocation of bus resources as a critical feature of efficient resource management. Memory load/store requests, also known as read/write requests, require the use of a memory bus for data transfers. An active software application may initiate a memory data transfer request to or from a system memory that resides in the IHS. A conventional processor system may include multiple requestors for memory access. Moreover, more than one program running concurrently with other programs may make a memory load/store request thus initiating a memory load/store or information transfer operation. Multiple processors within the processor system may also make a request for a common I/O bus. Thus, the various functional elements of a processor system must compete for and ultimately share resources of the processor system.

A processor system typically includes a resource manager that manages multiple requests for the memory bus and allocates portions of each resource's bandwidth to each resource requester. The processors or processor elements within the processor system are the resource requesters. The balancing of resource requests with resource availability provides the primary challenge in the design of an effective resource manager. The processor system also includes common I/O interface busses that competing requesters must share. More particularly, the processor system shares the common I/O interface bus among competing operating systems, software applications and processor elements. The resource manager allocates bandwidth to competing I/O interface resource requesters. The I/O interface bus communicates with external devices such as, but not limited to, a neighboring processor system, display, keyboard, mouse, media drive, and other devices.

A conventional software architectural hierarchy for a processor system may include a hypervisor, namely a layer of software that controls access of the operating system(s) to processor resources, memory resources, and I/O resources. The hypervisor enables multiple software applications and operating systems to execute in the processor system or IHS without debilitating conflict. The hypervisor controls the resource manager and limits the amount of memory and I/O bus bandwidth the resource manager allows per program application, thus providing an environment for multiple program applications to effectively co-exist cooperatively within the processor system. The resource manager controls the memory bandwidth and I/O bus bandwidth by limiting or restricting the use of the memory and I/O busses. Without such a resource manager, one application could consume I/O resources in an unrestricted manner, thus not allowing another application to receive sufficient bus bandwidth to complete application tasks within a reasonable timeframe. Poor resource management of the memory bus or I/O bus may create undesired conditions such as continuous re-try or program halt. More particularly, poor bus resource management may cause the processor system to inefficiently consume limited bus bandwidth resources.

Processor systems wherein a processor or single integrated circuit includes multiple cores or processor elements as well as memory and I/O controllers are now commonplace. Such a processor system is sometimes referred to as a multi-core processor or system-on-a-chip (SoC). Such a processor system may include one or more hardware units (HUs) that are capable of requesting access to memory and I/O resources. HUs may include a general processor core or cores, a specific processor core or cores, and I/O controllers that may initiate requests on behalf of I/O devices. A resource manager in such a multi-core processor may allocate portions of memory and I/O bandwidth to resource allocation groups (RAGs) of the hardware units in the processor system. Unfortunately, this allocation is typically relatively coarse. For example, it does not address differing resource needs among multiple operating systems or program applications running on a single hardware unit. Such a coarse allocation of resources may cause operational problems in the processor system or IHS. For example, with such a coarse allocation of resources, a high bandwidth application such as a virus scan may effectively starve execution of a user-interactive application such as a graphical user interface. This may cause a detrimental effect on the user experience.

What is needed is a method and apparatus that addresses the problems faced by resource managers in processor systems such as described above.

SUMMARY

Accordingly, in one embodiment, a method is disclosed for accessing a shared resource by a processor including a plurality of hardware units. The method includes receiving, by a hardware unit in the processor, an instruction for execution that calls for an access request to the shared resource. The method also includes providing resource allocation identification information to the instruction as it passes through a plurality of pipelined stages in the hardware unit, the resource allocation identification information accompanying the instruction from pipelined stage to pipelined stage in the hardware unit. In one embodiment wherein one of the pipelined stages is an address translation pipelined stage that performs effective to real address translation for the instruction, the resource allocation identification information is associated with the instruction at the address translation pipelined stage. In one embodiment, wherein one of the pipelined stages is a store queue, the store queue receives the instruction and associated resource allocation identification information after address translation by the address translation pipelined stage.

In another embodiment, a processor is disclosed that includes a plurality of hardware units situated on a semiconductor die. The plurality of hardware units is configured to access a shared resource that is external to the plurality of hardware units. The plurality of hardware units includes a first hardware unit. The first hardware unit includes a plurality of pipelined stages, wherein the first hardware unit receives an instruction for execution that calls for an access request to the shared resource. The first hardware unit is configured to provide resource allocation identification information to the instruction as it passes through the plurality of pipelined stages in the first hardware unit. In one embodiment, one of the pipelined stages of the first hardware unit is an address translation pipelined stage that performs effective to real address translation for the instruction, the resource allocation identification information being associated with the instruction at the address translation pipelined stage. In one embodiment, one of the pipelined stages is a store queue, the store queue receiving the instruction and associated resource allocation identification information after address translation by the address translation pipelined stage. In one embodiment, each of the plurality of hardware units other than the first hardware unit includes a plurality of pipelined stages, wherein such other hardware units receive an instruction for execution that calls for an access request to the shared resource. Such other hardware units provide resource allocation identification information to respective instructions passing through the plurality of pipelined stages in such other hardware units.

BRIEF DESCRIPTION OF THE DRAWINGS

The appended drawings illustrate only exemplary embodiments of the invention and therefore do not limit its scope because the inventive concepts lend themselves to other equally effective embodiments.

FIG. 2 shows a resource allocation map of the processor system of FIG. 1.

FIG. 7 is a representation of an example FIFO store queue of the disclosed hardware unit of FIG. 4.

DETAILED DESCRIPTION

Figure 1:
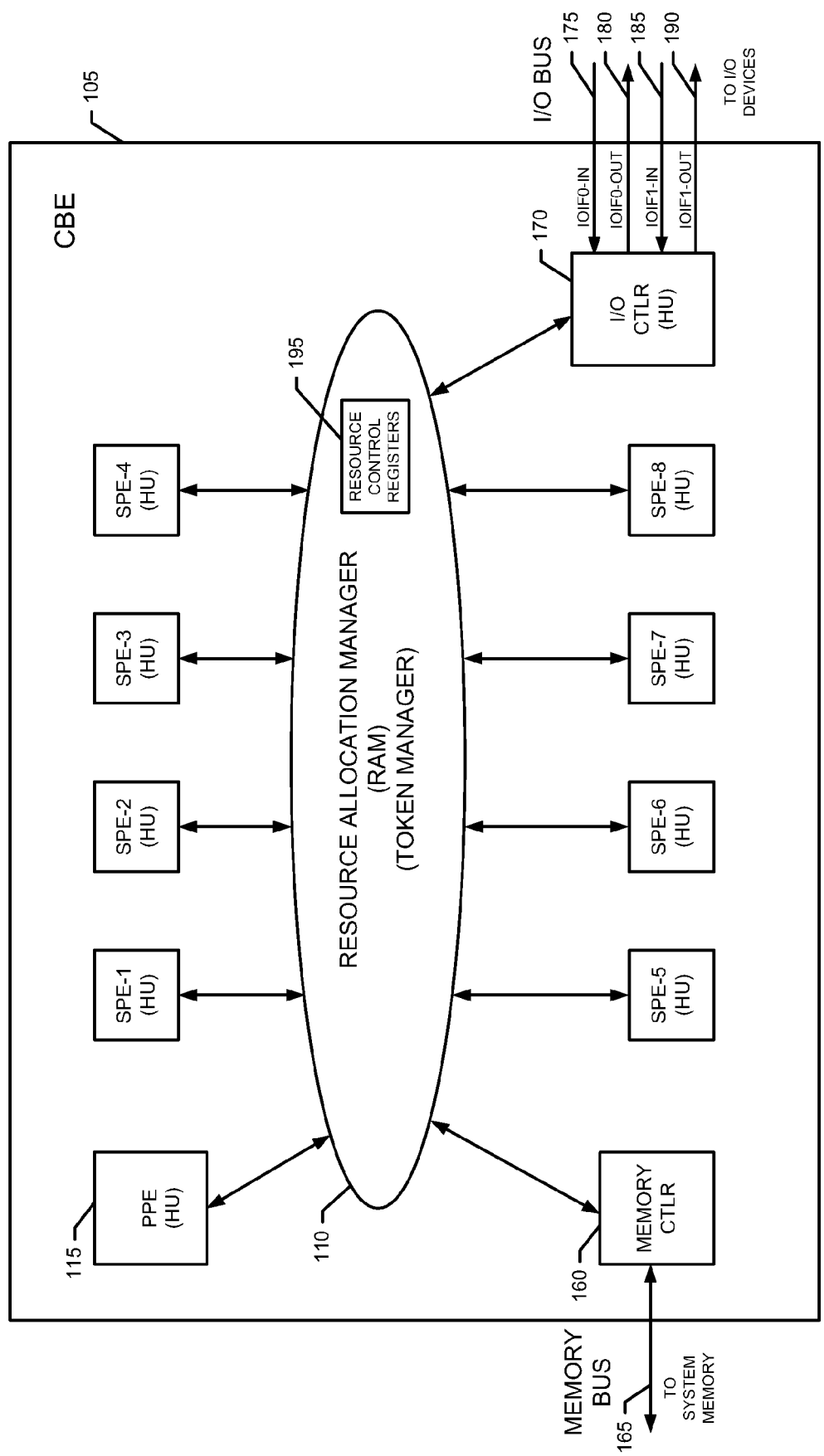
FIG. 1 shows a block diagram of a resource manager for a processor system.

In a processor system that includes multiple processor units, a resource allocation manager (RAM) may manage resource bandwidth rates among multiple program applications by assigning memory and I/O bandwidth allocation rates to each processor unit that may request memory or I/O access. The term hardware unit (HU) corresponds to each processor unit within the processor system that may issue a memory or I/O access request. A load or store instruction within a system software program application, executing within such a hardware unit, may generate a specific memory or I/O request. A token manager is an example of one type of resource allocation manager (RAM) that a processor system may employ. A token manager may contain one or more resource control registers that govern the resource bandwidth allocation rate for each hardware unit (HU). The RAM groups hardware units HUs into resource allocation groups (RAGs). The resource control register identifies each specific RAG in the processor system by assignment of a discrete identifier within the token manager. The token manager grants use of the memory and I/O interface busses to a requesting hardware unit (HU) via a token grant process. Tokens provide discrete control of bus bandwidth requests by HUs to control memory and I/O bus bandwidth usage. The amount of bus bandwidth that the token manager associates with each resource allocation group (RAG) is known as the token rate, namely the rate at which the token manager grants tokens to requesting HUs within the given RAG. The token manager may assign a specific bandwidth allocation rate to a specific RAG by associating with the RAG's identifier a specific token rate in the token manager's resource control registers.

The hypervisor may reprogram the resource control registers in the token manager to modify the token rate or bandwidth allocation rate for each RAG assignment of HUs in the processor system. The amount of time or system bus cycles to modify the token rates for an existing RAG is a major drawback in changing RAG assignments during program execution. The executing program should initially use up or "flush" all current outstanding resource requests, namely those resource requests or instructions which use the existing resource allocation settings. The processor system accomplishes this instruction flush with a "SYNC" command. Moreover, the program application should insert the SYNC command instruction before the existing instruction for which the new bandwidth allocation rates take affect. The SYNC command causes the existing pipeline queue of program instructions to continue processing until the pipeline queue completes, or empties prior to the next instruction after the SYNC command. All bus I/O operations should complete before the new bandwidth rates can take effect. This SYNC command-based process may consume an undesirably large amount of time.

Once the SYNC command process completes, the next instruction in the pipeline queue can modify the RAM control register and consequently the RAG bandwidth allocation rates. The process of modifying the control registers of the RAM may also consume undesirably large amounts of time because the distance between the RAM and the HU that requests the new RAG assignments is relatively large. Once the new RAG assignments are complete, the instruction pipeline queue in the HU can continue processing with new bandwidth allocation rates for subsequent instructions. Unfortunately, this slow RAG assignment change process may cause system delays related to complex system clock cycles that execute during bandwidth allocation rate changeovers. For these reasons, this RAG assignment change process is not a desirable methodology for changing bandwidth allocation rates.

In another approach to RAG assignment change, each HU uses a resource allocation identifier (RAID) register in the respective HU to identify the HU assignment to a specific RAG. Modifying the RAID assignment and thus resource bandwidth allocation rate for a specific HU is a more practical approach to adjusting resource bandwidth rates among individual instructions. Because the HU maintains the RAID information locally, the processor system uses less system bus cycle time to change the RAID and thus associate the HU with a different RAG having a potentially different bandwidth allocation rate. This local RAID storage approach is faster than the approach without local RAID storage. However, in this local RAID storage approach, the processor system must still flush the instruction pipeline queue to allow the new bandwidth allocation rate to synchronize with the next instruction requiring the new rate. Thus, the local RAID storage approach is still undesirably costly in terms of system resource time.

The resource allocation manager (RAM), that is central to the hardware units (HUs) within the processor system, manages HU requests for memory access and I/O interface access. Moreover, the RAM manages bus usage by controlling the respective bandwidth allocation rate for each resource allocation group (RAG) of HUs. Although system software may allocate system memory stores to a specific task in the processor system, the memory bus represents a resource that multiple applications must share. Moreover, the RAM must manage memory bus bandwidth effectively to provide for efficient use of memory resources.

FIG. 1 is a block diagram that depicts centralized resource management in a processor system 100. Processor system 100 includes a multi-core processor 105 with a centralized resource allocation manager RAM 110 integrated therein. One example of a multi-core processor is a cell broadband engine (CBE) processor such as shown in the publication entitled "Cell Broadband Engine Architecture, Version 1.0", by IBM Corp, Sony and Toshiba, Aug. 8, 2005, the disclosure of which is incorporated herein by reference in the entirety. RAM 110 couples to a power processor element PPE 115 that provides a general purpose computing capability. In one approach, RAM 110 is a token manager that grants tokens for memory or I/O bus approval to a requesting HU. Each token may represent a particular allocation rate of bus bandwidth such as 128 bytes, for example, or other value depending upon the particular application.

The power processor element PPE 115 is capable of accumulating or banking tokens from the RAM 110. More particularly, PPE 115 may request a token from RAM 110 and bank, or hold onto the token from RAM 110. PPE 115 may use the token as authorization from RAM 110 for a future memory or I/O request. This particular processor system 100 includes 8 synergistic processor elements, namely SPE-1, SPE2, SPE-3, SPE-4, SPE-5, SPE-6, SPE-7, and SPE-8 that couple to RAM 110 as shown in FIG. 1. Each of the 8 SPEs as well as PPE 115 may request a token individually from RAM 110. Each SPE and PPE is thus a hardware unit (HU) as defined herein. In this particular processor system 100, the SPEs and PPE can represent four resource allocation groups (RAGs). Control registers within RAM 110 store the bandwidth allocation rates for each RAG.

A memory controller 160 couples to RAM 110 and manages the interface to a memory bus 165. Memory bus 165 interfaces to the system memory (not shown) of the later discussed information handling system (IHS). The system memory may include 8 banks of equal memory size. The HU, such as a PPE or SPE, requesting a memory load or store accesses each bank of memory individually. RAM 110 issues separate tokens for each bank. An individual bank of memory requires setup and settling time during access load and store. Each bank of memory requires multiple bus cycles to complete any load or store operation. RAM 110 avoids issuing repeated tokens for the same bank of memory in succession due to the long latency for any memory bus operation.

An I/O interface controller 170 couples to the RAM 110 and manages the I/O interface to high speed and low speed interface busses. More particularly, the high speed interface input bus IOIF0-IN 175 and high speed interface output bus IOIF0-OUT 180 couple processor 105 to high speed devices such as another CBE or a graphics display. The low speed interface input bus IOIF1-IN 185 and low speed interface output bus IOIF1-OUT 190 couple processor 105 to lower speed interface devices such as keyboard and compact disk read/write drives. I/O bus is a shortened term for Input/Output interface bus 175-190.

A hardware unit (HU) is a hardware element, processor element or functional unit in processor system 100 that directly requests the use of memory or I/O resource bandwidth, by generating load or store requests to memory addresses or to I/O in processor system 100. RAM 110 controls the amount of memory and I/O interface bandwidth that RAM 110 allocates for any resource allocation group (RAG) of hardware units (HUs) within processor system 100. As shown in FIG. 1, processor system 100 includes HUs such as PPE 115, and SPE's 1-8. I/O interface controller 170 qualifies as the tenth HU in this particular processor system 100 architecture due to the interface controllers 170 ability to request direct memory access (DMA) on behalf of I/O devices. The memory controller 160 and memory bus 165 do not qualify as hardware units HUs because neither memory controller 160 nor memory bus 165 requests the use of the memory or I/O busses directly. The 10 HUs all vie for use of memory and I/O bandwidth of the CBE through operations and interaction with RAM 110.

RAM 110 organizes HUs into groups of equal bandwidth allocation rates, namely resource allocation groups or RAGs. RAM 110 allocates a given percentage of the total I/O bus bandwidth to each RAG. RAM 110 generates tokens, granting thereto a given RAG. Moreover, RAM 100 manages the resource allocation by means of the issue or grant rate of tokens. Each token provides a mechanism for memory bus and I/O interface bus resource allocation. Each token supports 128 bytes of bandwidth for memory or I/O in this example. When RAM 110 issues a token grant to an HU, the HU then initiates the approved I/O or memory bus process up to the token size of 128 bytes of I/O bus use and manages the I/O or memory bus process until complete.

FIG. 2 is a chart that depicts one resource allocation map that RAM 110 of the processor system 100 of FIG. 1 may employ. The chart includes a column 210 representing a resource allocation group number or RAG number (RAG#). RAM 110 operates in accordance with the resource allocation map that FIG. 2 depicts. System software which may include the hypervisor determines the bandwidth allocation rates for processor system 100. Moreover, the system software loads resource control registers 195 of RAM 110 with RAG assignments of bandwidth rates. RAM 110 manages the specific memory bus and I/O interface bandwidth allocation rates to each of four resource allocation groups RAGs, namely RAG# 0-3 as seen in column 210. RAM 110 manages I/O bandwidth allocation rates to a specific hardware unit (HU), and bases the allocation rates on the RAG number that system software assigns to that specific RAG. The software instruction that requests a memory access or interface I/O transfer uses the resource allocation rate assignment that the RAG number associates between the HU of column 215 and the RAG number of column 210 in FIG. 2.

As seen above, hardware units (HUs) are the hardware processing elements of a processor system that have the ability to request a memory access or I/O interface transfer. In the example of FIG. 1 and column 215 of FIG. 2, the hardware units (HUs) are the PPE, SPE-1, SPE2, SPE-3, SPE-4, SPE-5, SPE-6, SPE-7, SPE-8, and finally I/O interface controller 170. System software assigns specific RAG numerical associations to each HU as shown in column 210 by assigning specific RAID bits to a respective RAID register in each HU. Moreover, the RAG numerical assignment of column 210 may change dynamically, allowing the processor system 100 to change the I/O bus bandwidth allocation rate assignments on the fly as system software desires. As shown in the map of FIG. 2, RAM 110 assigns hardware units PPE 115 and SPE-1 to RAG number equal to 0 or RAG0. The RAG0 assignment represents a specific bandwidth allocation rate for the hardware units HUs in RAG0. Bandwidth allocation rate assignments for future requests for memory access or I/O interface requests from PPE 115 and SPE-1 will correspond to the RAG0 assignment until system software and more specifically the hypervisor modifies the assignments. In the example of FIG. 2, RAM 110 further assigns SPE-2, SPE-3, SPE-4, and SPE-5 to a RAG number 1 of 1 or RAG1. RAM 110 assigns SPE-6, and SPE-7 to a RAG number 2 or RAG2. RAM 110 assigns SPE-8 to a RAG number 3 or RAG3. I/O Controller 170 contains 4 virtual I/O channels (not shown), each corresponding to a specific RAG number, namely RAG0-RAG3, as shown adjacent I/O controller 170 in RAG number column 210. Moreover, RAM 110 assigns each I/O request originating from an I/O device to a given virtual channel, thereby assigning the I/O request to a corresponding RAG.

Processor system 100 may further divide a memory bank 220 into 8 separate banks in one example. Each separate bank of memory represents a unique memory load or store operation. Memory bank access or memory data transfers require a token request to RAM 110 and a corresponding token grant by RAM 110. RAM 110 manages transfer bandwidth of the memory bank load and store operations. RAM 110 associates each memory bank load or store request with a single bandwidth rate. Memory controller 160 manages each individual memory bank I/O load and store operation in processor system 100.

The RAM 110 token request and token grant process represents a percentage of the total bus bandwidth availability. Moreover, bandwidth allocation rates are a percentage of the entire bus availability, namely 100%. In the example of FIG. 2, bandwidth percentages are shown in each column of the memory bank 220. RAG0 is shown to represent 20% of the total memory bus bandwidth. RAG1 represents 30% of the total memory bus bandwidth. RAG 2 represents 15% of the memory bus bandwidth. As shown in FIG. 2, RAG3 represents 10% of the total memory bus bandwidth. Finally, RAG0-RAG3 which correspond to the 4 virtual channels of I/O controller 170, represent 10% of the total memory bus bandwidth. Although the total bus bandwidth for the memory bus is 100%, the total of all RAG assignments for bus bandwidth percentage does not necessarily equal 100%. More particularly, since full bus utilization is not always the normal condition of processor system 100, the total percentage of memory bandwidth may combine to equal something less than 100%. In the example of FIG. 2, the total percentage of memory bandwidth, namely 85% describes the addition of all percentages shown in column 220.

An I/O interfaces column 230 in FIG. 2 depicts the second through fifth resources that RAM 110 will manage. These link resources include I/O buses IOIF0-In 175, IOIF0-Out 180, IOIF1-In 185, and IOIF1-Out 190. Each of these four I/O interface busses represents a specific bandwidth allocation resource and I/O interface bus allocation percentage rate for RAM 110. More particularly, as FIG. 2 depicts, RAM 110 assigns a specific HU a specific RAG number which in turn assigns the bandwidth allocation rate, shown as a percentage, to each of five associated resources namely memory bank 220, and each of four I/O 230 busses. IOIF0-In 175 is shown in FIG. 2 to represent a 10% I/O interface bus bandwidth allocation rate for RAG0, 20% for RAG1, 15% for RAG2, 15% for RAG3 and finally 20% for RAG0-RAG3. As in the case of memory bus, the total bus bandwidth allocation percentages need not combine to form 100% of the total I/O interface bus bandwidth allocation. IOIF0-Out 180, in column 230 represents a 15% I/O interface bus bandwidth allocation rate for RAG0, 10% for RAG1, 20% for RAG2, 25% for RAG3 and finally 15% for RAG0-RAG3. IOIF1-In 185, represents a 15% I/O interface bus bandwidth allocation rate for RAG0, 20% for RAG1, 10% for RAG2, 10% for RAG3 and finally 10% for RAG0-RAG3. IOIF1-Out 190 as shown in FIG. 2, represents a 10% I/O interface bus bandwidth allocation rate for RAG0, 10% for RAG1, 30% for RAG2, 15% for RAG3 and finally 15% for RAG0-RAG3. In some instances, RAM 110 may use an additional RAG number assignment to manage memory or I/O requests from requesting HUs that have no current allocation of bandwidth or token grant.

Figure 3:
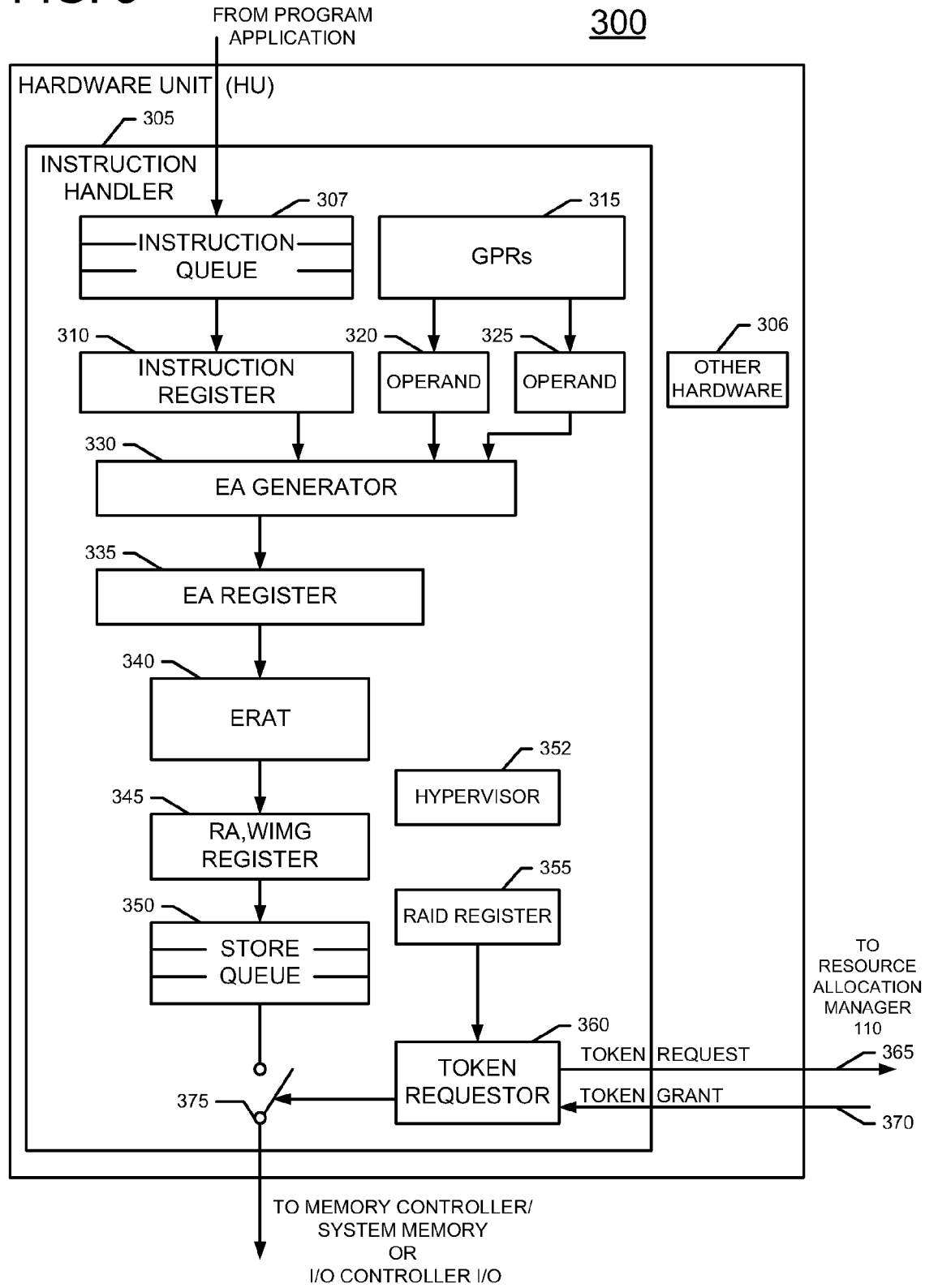
FIG. 3 shows a block diagram of a hardware unit usable in the processor system of FIG. 1.

FIG. 3 shows a block diagram of hardware unit (HU) 300 that contains a resource allocation identifier (RAID) register 355. A multi-core processor system such as processor system 100 may employ HU 300 as any and all of its hardware units. More specifically, processor system 100 may use HU 300 as PPE 115, SPE-1-SPE-8 and I/O controller 170. However, a processor system 100 with such an HU 300 configuration may experience the bus bandwidth allocation assignment problems below.

Hardware unit (HU) 300 includes an instruction handler 305 and other hardware 306. Instruction handler 305 includes a multi-stage instruction pipeline that handles instruction execution as per the discussion below. Other hardware 306 may include hardware such as local cache memory, an arithmetic logic unit (ALU) or other hardware appropriate to the particular type of HU. For example, a PPE or SPE type HU may include an ALU whereas an I/O controller type HU may not include an ALU.

Each specifically configured HU such as representative HU 300 within processor system 100 may initiate a series of programming software instructions as part of a larger software application or a program application that executes within the processor system. A particular hardware unit, HU 300, receives a sequence of instructions from the program application executing within processor system 100. The program application output feeds the input of an instruction queue 307. HU 300 places the instruction in instruction queue 307 of the instruction handler 305 within HU 300. Instruction queue 307 couples to an instruction register 310 that contains the next instruction for execution within HU 300. HU 300 decodes the next instruction for execution within the HU, for example a memory store or I/O interface store instruction. The store instruction requires a memory or interface I/O request. After this store instruction, the next instruction that HU 300 initiates moves from instruction queue 307 to instruction register 310.

During an instruction store sequence, HU 300 first evaluates the effective address (EA) to which the HU will write data when the HU completes execution of the store instruction. Instruction handler 305 includes a set of general purpose registers (GPRs) 315 that contain operands to facilitate the computing of the effective address (EA) of the write instruction. The general purpose registers (GPRs) 315 couple to an operand register 320 and an operand register 325. The instruction register 310, the operand register 320, and the operand register 325 all couple to respective inputs of an EA generator 330. EA generator 330 calculates the effective address (EA) for the store instruction in instruction register 310. The output of EA generator 330 couples to the input of an EA register 335 and provides the effective address of the store instruction thereto. The output of EA register 335 couples to the input of an effective to real address translator (ERAT) 340. ERAT 340 receives as input the effective address data from EA register 335.

During a memory or I/O store request, HU 300 uses effective address translation within the software application operational architecture to generate real addresses. Real addresses relate directly to memory address locations. More particularly, the real address corresponds to a memory location outside the HU such as in the system memory (not shown) of an IHS. ERAT 340 may function as a lookup table (LUT) using a page table cache of page table translation data in an associative array. Moreover, each entry in ERAT 340 is a page table entry (PTE). Each entry of ERAT 340 maps an effective address (EA) to a real address (RA) for a page of memory. The effective address (EA), or virtual address, represents the input to the ERAT 340 page table cache or memory map array. The ERAT 340 data table stores the real address (RA), and WIMG bits that associate with the EA input. HU 300 organizes ERAT caches by memory pages. Memory pages of ERAT 340 may exhibit a fixed size or one of multiple different sizes. These memory pages represent the highest order set of bits for address under translation. In one example, ERAT 340 may translate a 4 K byte effective address. In this particular example, ERAT 340 does not use the lower order 12 bits of the effective address for translation. More specifically, ERAT 340 interprets the lower order 12 bits of the effective address as page offsets wherein the lower order 12 bits of the 4 K byte effective address remain intact after translation. The page thus represents the remaining upper address bits of the effective and real address (RA).

ERAT 340 stores the WIMG bits as memory address transfer attributes. More specifically, in the example of FIG. 3, ERAT 340 stores WIMG bits as address storage attributes. WIMG bits determine the manner in which software and hardware in the processor system access memory. The WIMG bits include a W bit that corresponds to the write-back or write-through status for the address request, and an I bit that signifies either a cache-enabled or cache-inhibited status of the store request. The M bit represents the local or global access rights of the store request. The G bit corresponds to the guarded or unguarded status of the address store request. The output of ERAT 340 couples to the input of an RA,WIMG register 345. ERAT 340 generates the physical or real address RA, and the set of storage attributes WIMG bits as output. The RA,WIMG register 345 receives as input the output of the effective to real address translation module ERAT 340. The output of RA,WIMG register 345 couples to the input of a first in first out (FIFO) pipeline store queue 350. The store queue 350 receives instruction sequences from RA,WIMG register 345. Moreover, HU 300 collects and stores these instruction sequences in the (FIFO) pipeline store queue 350. The instruction pipeline store queue 350 holds subsequent instructions from RA,WIMG register 345. Filling the store queue 350 allows new addresses to translate through ERAT 340 while HU 300 executes the current instruction. The current instruction resides in the lowermost location of the pipeline (FIFO) store queue 350. HU 300 executes the current instruction of a full or partially full store queue 350 and waits for memory or I/O bus access for the current instruction.

HU 300 includes a hypervisor software layer 352, as shown in FIG. 3. Moreover, the hypervisor 352 running within HU 300 populates RAID register 355 with a two bit binary code representing a RAG identifier. The output of RAID register 355 couples to the input of a token requestor 360. The token requestor 360 requests tokens from the resource allocation manager RAM 110 when HU 300 requires a memory or I/O bus operation. RAID register 355 contains two binary bits of data that identify one of four RAGs, namely RAG0, RAG1, RAG2, or RAG3. More particularly, RAG0 to RAG3 correspond directly to the respective bandwidth allocation rates in RAM 110. HU 300 reads the lowermost entry of store queue 350 and initiates an I/O request by sending the RAID bit values in RAID register 355 to token requestor 360. Subsequently, token requestor 360 generates an output signal token request on an output signal token request line 365 that couples to RAM 110. In this manner, token requester 360 sends a request for memory bus access to resource allocation manager RAM 110. The output signal token request includes the two HU 300 RAID bits from RAID register 355. The two RAID bits from RAID register 355 represent the RAG identifier RAG0 to RAG3 respectively for HU 300. RAM 110 receives the token request and evaluates the bandwidth allocation rate that HU 300 needs. RAM 110 evaluates the RAID identifier bit of HU 300 against current bandwidth usage and issues a token grant by generating a token grant signal on token grant line 370 which transmits the token grant to token requester 360.

More particularly, RAM 110 generates the token grant signal on line 370 input when the proper timing and bandwidth analysis within RAM 110 completes. The output of store queue 350 couples to one input of a switch 375. Switch 375 represents hardware that allows a resource request to proceed after grant of a token. If the output of store queue 350 is a memory store instruction, the store request requires the use of the memory bus 165. If the output of store queue 350 is an I/O store instruction, the store request requires the use of the I/O bus 175-190. HU 300 evaluates the output of store queue 350 to determine which bus, namely memory bus 165 or I/O bus 175-190, the store request requires. Switch 375 effectively connects and disconnects the output of store queue 350 to a memory controller 160/system memory 165 or I/O controller 170/I/O bus 175-190 of processor system 100 of the FIG. 1. This switching is under the control of the token requester 360 that couples to switch 375 of HU 300. When token requester 360 receives a token grant signal on token grant line 370 from RAM 110, HU 300 effectively closes switch 375 and initiates the final stages of the store operation. Moreover, HU 300 allows the lowermost entry of store queue 350 to transfer through switch 375 and access memory bus 165 or I/O bus 175-190, thus placing the real address and WIMG bits on the memory or I/O bus depending on the type of store operation. Storage data and data size accompany the real address and WIMG bit data.

The above described methodology depicts a store operation within processor system 100 of FIG. 1. Alternatively, processor system 100 may handle a load operation that does not generate write data, but rather requests read data. More specifically, during a load operation, processor system 100 does not write data onto the I/O interface bus 170-190 or into system memory via memory bus 165. The load operation includes two phases. In the first phase, the HU initiates a load request and ultimately places a real address on memory bus 165 or I/O interface bus 170-190. In the second phase, after the processor system retrieves the load data, the processor system presents the load data to the requesting HU and the load operation completes. The real address, WIMG bits, and RAID bits perform the same role in load operations as they do in store operations. However, for simplicity, the following discussion focuses on store operations.

Referring to both FIG. 1 and FIG. 2, RAM 110 assigns each HU of processor system 100 a specific RAG number in the control registers 195 of RAM 110. Moreover, the RAG number assignment provides flexibility in differentiating specific bandwidth allocation rates per each hardware unit HU of the processor system. However, differentiating bandwidth allocation rates among program applications or specific instructions within each HU requires supplemental operations.

Referring again to both FIG. 1 and FIG. 2, modifying the data in control registers 195 in RAM 110 provides one approach for changing the bus bandwidth allocation rate assignments on a per instruction basis. More specifically, the hypervisor 352 may modify bandwidth allocation rates by reprogramming resource control registers 195 within RAM 110 with new bus bandwidth values. Once the store operation to resource control registers 195 completes, the specific HU requesting the store initiates all new bus operations with the new RAG number assignment wherein new bus bandwidth allocation rates apply. System software of processor system 100 executes an instruction which in turn associates with a RAG or RAGs that exhibit a new bandwidth allocation rate. Unfortunately, this approach may take multiple bus cycles to complete and tends to result in inefficient processing by processor system 100.

Reprogramming the RAID bit assignments in RAID register 355 provides yet another approach for changing bandwidth allocation rate assignments on a per instruction basis. Modifications to RAID register 355 of FIG. 3 remain internal to the specific HU such that long cycle time external store operations are not necessary. Unfortunately, RAM 110 limits the new RAID register 355 assignments to those existing RAG numbers and bandwidth allocation rate assignments already in the control registers of RAM 110. The system programmer or processor system compiler must recognize the RAID re-assignment and generate the proper sequence of instructions to allow the change to be made without conflicts within the specific HU. Moreover, HU 300 must insert a SYNC statement between any two adjoining store instructions to first flush the instruction queue 307 of all store instructions prior to the last RAID modification, and hold the queue for the next store operation requesting the new bandwidth allocation rate. More particularly, the queue must go into a hold state, emptying all instructions ahead of the store operation that requires a new bandwidth allocation rate. Next, the hypervisor 352 generates a load to RAID register 355 with new resource allocation identifiers. Once HU 300 flushes the queue with the SYNC command, the preceding store operations must complete their bus cycles before freeing the bus for the next operation. The specific HU then executes the store instruction that benefits from the new RAID bit assignments. Unfortunately, issuing SYNC commands in the above described manner may have a heavy negative impact on processor system performance because SYNC statements cause multiple instruction queue pipeline delays. For these reasons, using the HU configuration of HU 300 of FIG. 3 for the HUs in processor system 100 of FIG. 1 may not be desirable.

Figure 4:
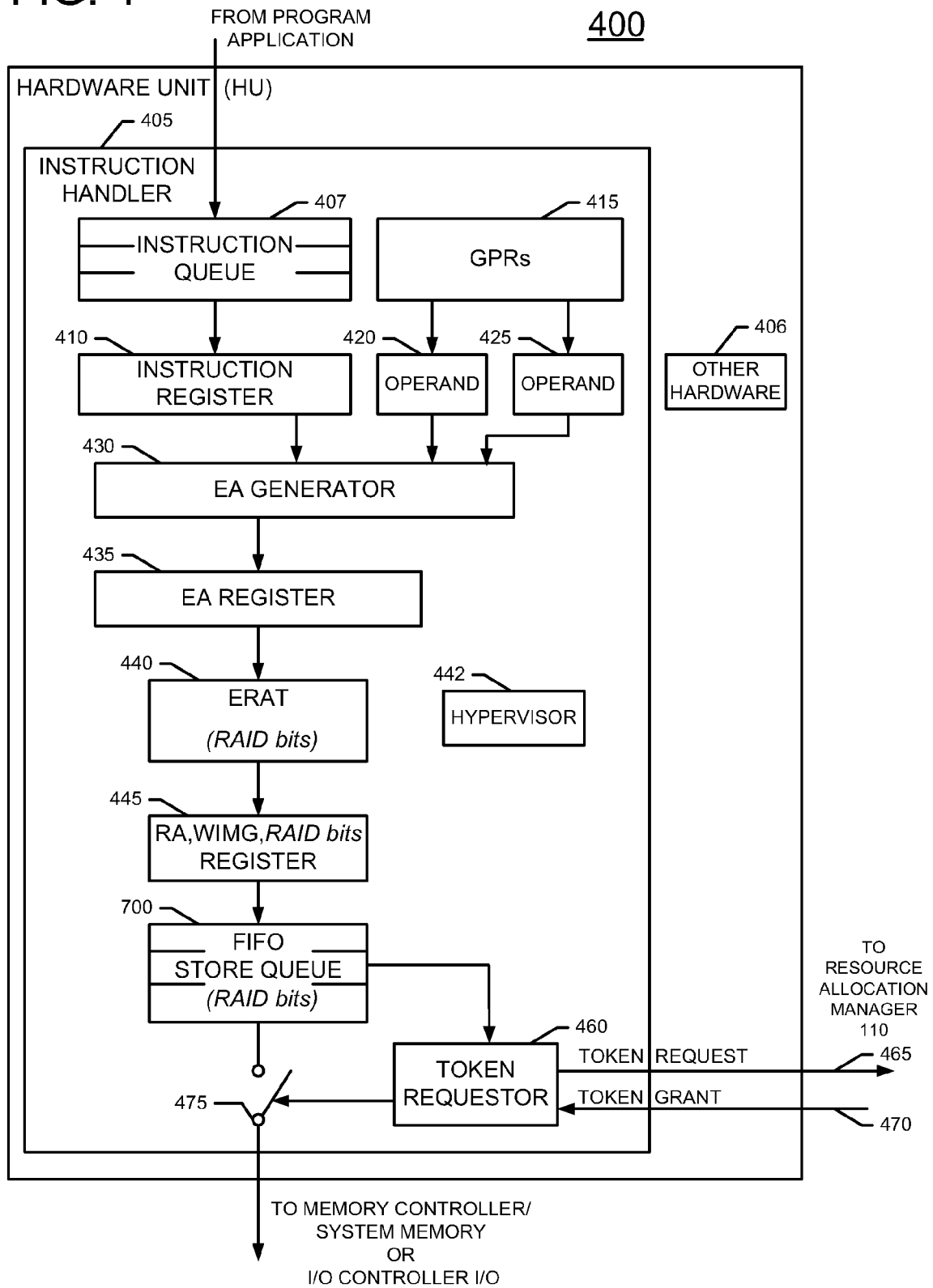
FIG. 4 is a block diagram of the disclosed hardware unit usable in a processor system.

FIG. 4 shows a block diagram of a representative hardware unit (HU) 400 that practices the disclosed methodology to allow different bandwidth allocation rates on a per instruction basis, or a per access request basis, within a specific HU. In one embodiment of the disclosed methodology and apparatus, each instruction may correspond to a specific I/O bus bandwidth allocation rate without introducing undesirable long latency SYNC instructions or additional store instructions that modify RAM 110 RAID register data.

Figure 5:
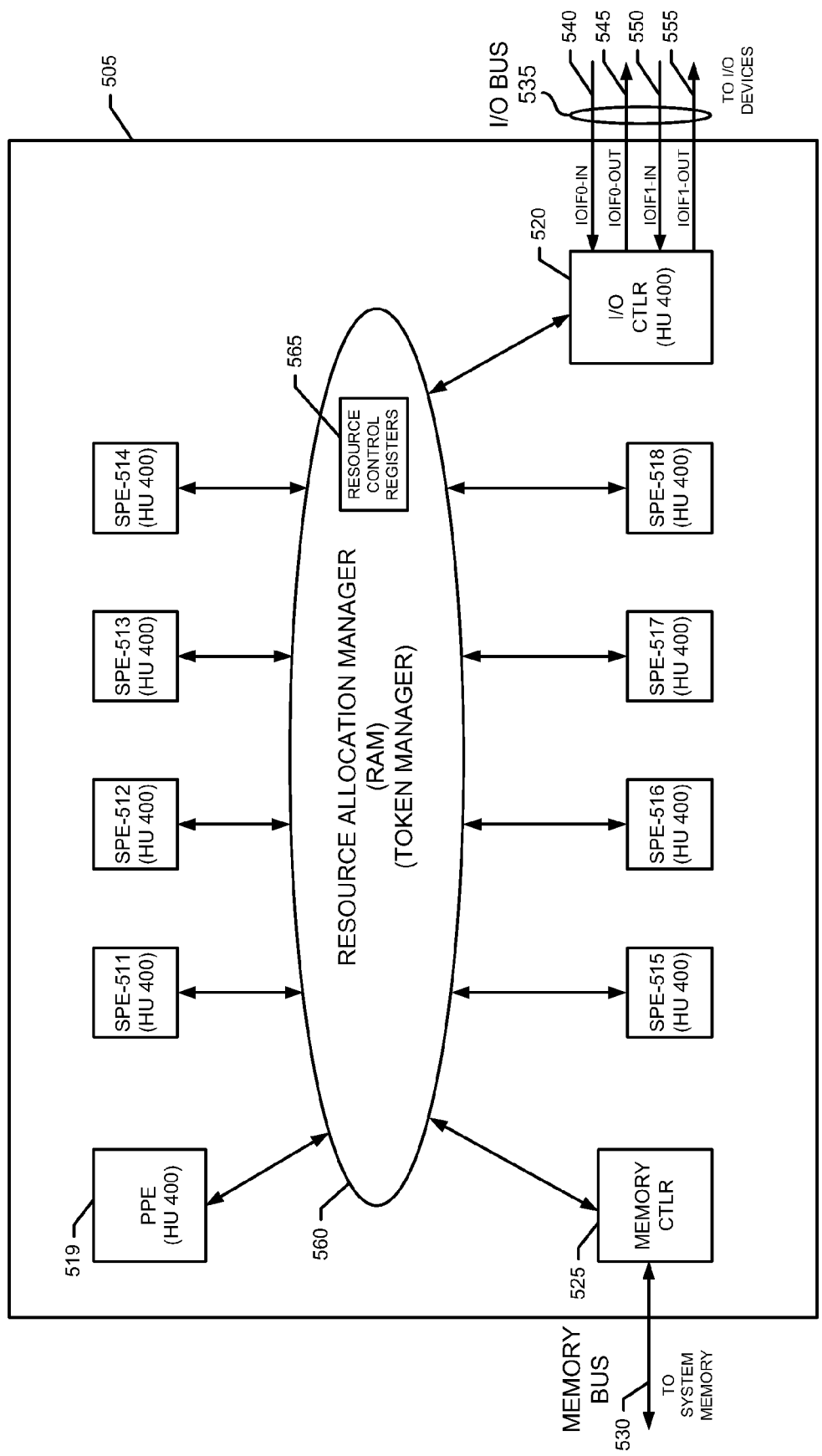
FIG. 5 shows a block diagram of the disclosed processor system that includes the hardware unit of FIG. 4.

FIG. 5 is a block diagram of a processor system 500 that includes a semiconductor die 505. Processor system 500 employs a respective hardware unit such as HU 400 for each of its hardware units. More specifically, processor system 500 may use HU 400 as SPE-511-SPE-518, PPE 519, and I/O controller 520. Processor system 500 may employ the architecture of the above cell broadband engine (CBE) to configure the multiple cores that form this multi-core processor system. Processor system 500 includes a memory controller 525 that couples to a memory bus 530. Memory bus 530 couples to a system memory (not shown). The I/O controller 520, also known as I/O interface (IOIF) controller 520 of processor system 500, couples to an I/O bus 535. I/O bus 535 includes an IOIF0-IN bus 540, and IOIF0-OUT bus 545, an IOIF1-IN bus 550 and an IOIF1-OUT bus 555, as shown in FIG. 5.

Processor system 500 includes a resource allocation manager (RAM) 560 that handles requests for access to memory bus 530 and I/O bus 535. RAM 560 includes resource control registers 565 that control the allocation of resources to requesters. In one embodiment, RAM 560 of FIG. 5 may exhibit the same configuration and functionality as RAM 110 of FIG. 1.

Returning to FIG. 4, hardware unit (HU) 400 includes an instruction handler 405 and other hardware 406. Instruction handler 405 includes a multi-stage instruction pipeline that handles instruction execution as per the discussion below. Hardware 406 may include hardware such as local cache memory, an arithmetic logic unit (ALU) or other hardware appropriate for the particular type of HU. For example, a PPE or SPE type hardware unit may include an arithmetic logic unit whereas an I/O controller HU may not include an ALU.

Each specially configured HU such as representative HU 400 within the processor system 500 may initiate a series of software program instructions as part of a larger software application or a program application that executes within the processor system. A particular hardware unit, HU 400, receives a sequence of instructions from the program application running within processor system 500. The program application output feeds the input of an instruction queue 407. HU 400 places the instructions in instruction queue 407 of the instruction handler 405. Instruction queue 407 couples to an instruction register 410 that contains the next instruction for execution within HU 400. HU 400 employs a decoder (not shown) to decode the next instruction for execution within the HU, for example a store instruction that requires a system memory request or an I/O interface request. After this store instruction, the next instruction that HU 400 initiates moves from instruction queue 407 to instruction register 410. During an instruction store sequence, HU 400 first evaluates the effective address to which the HU will write data when the HU completes execution of the store instruction.

Instruction handler 405 includes a set of general purpose registers (GPRs) 415, that contain operands to facilitate the decoding of the effective address (EA) of the write instruction. The general purpose registers 415 couple to a first operand register 420 and a second operand register 425. The instruction register 410, the first operand register 420, and the second operand register 425 all couple to the respective inputs of an EA generator 430. EA generator 430 calculates the effective address (EA) for the store instruction in instruction register 410. An EA register 435 couples to the output of the EA generator 430 and receives as input the computation of the effective address from EA generator 430. The output of EA register 435 couples to the input of an effective to real address translator (ERAT) 440. The elements of instruction handler 405 form a pipelined structure in which information passes from stage to stage or element to element. For example, instruction queue 407, ERAT 440, register 445 and FIFO store queue 700 are examples of some of the stages of this pipeline.

Figure 6:
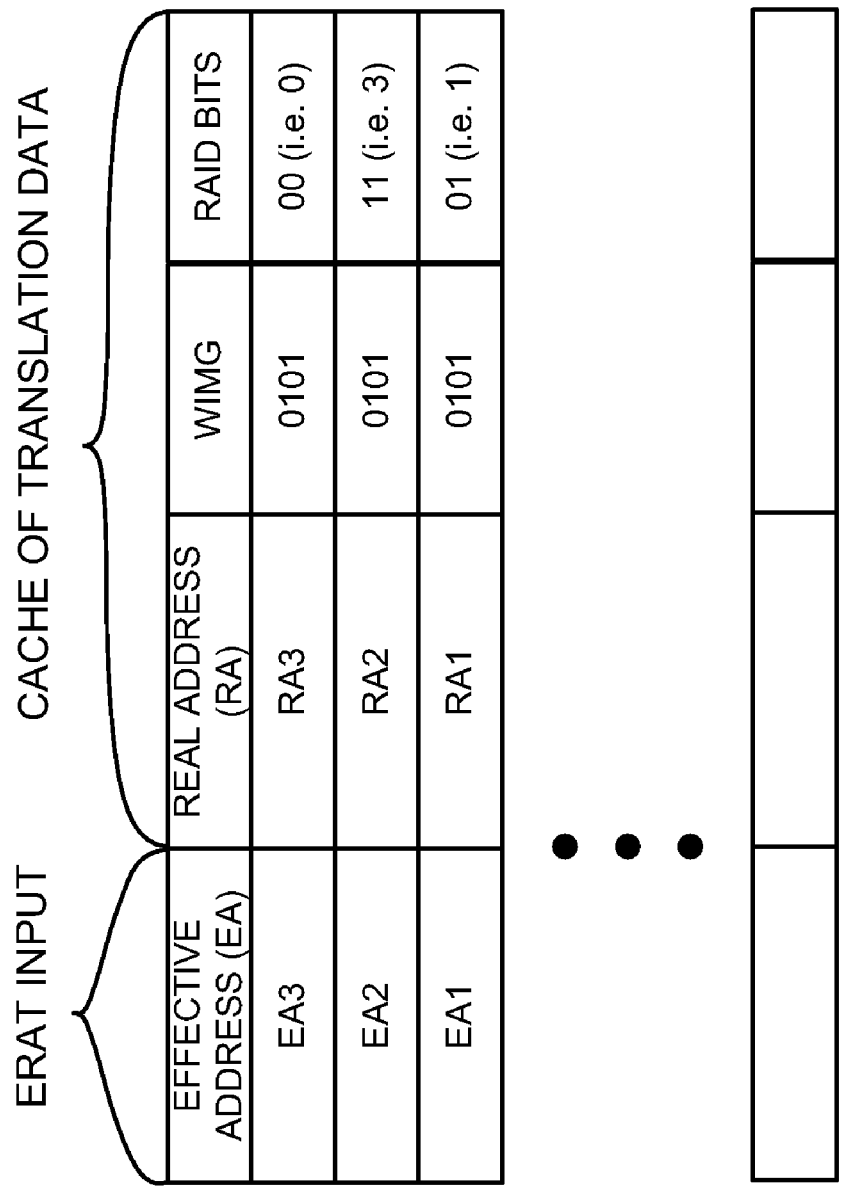
FIG. 6 is a representation of an example ERAT lookup table of the disclosed hardware unit of FIG. 4.

FIG. 6 shows a representative ERAT 440 of page number entries. A typical ERAT may contain 32 entries however larger and smaller ERATs are possible. Moreover, each entry in ERAT 440 is a page table entry (PTE). The ERAT 440 contains multiple entries of cache translation data and uses the effective address EA or effective page number (EPN) of the write instruction or store instruction as input. As seen in the FIG. 6, the top three of multiple entries of cache translation data are shown in detail. The ERAT 440 lookup table (LUT) contains the effective address (EA) to real address (RA) or real page number (RPN) data. Each row of the ERAT table maps an effective page number (EPN) to a real page number (RPN). ERAT 440 also contains WIMG bits, and RAID bits that associate with the RA data. More particularly, RAID bits are attributes of page table entries (PTEs) of ERAT 440. ERAT 440 may contain other attributes (not shown). ERAT 440 need not translate the page offset, or lower order bits of the EA input. Moreover, ERAT 440 need not store the lower order bits of EA and RA page table data. In this example, in the top entry of the ERAT 440, the HU 400 uses an effective address EA3 as input to ERAT 440. The ERAT 440 outputs a real address RA3 data. WIMG bits shown as 0101 represent respectively W, I, M, and G bits. The W bit, corresponding to write-back or write-through status for real address RA3, is a 0 thus designating a write-back. The I bit, corresponding to cache-enabled or cache-inhibited status for RA3, is a 1 thus designating cache-inhibited. The M bit, corresponding to local access or global access for real address RA3, is a 0 thus designating local access. The G bit, corresponding to unguarded or guarded status for real address RA3, is a 1 thus designating guarded status. A RAID assignment of 00, (i.e. 0), associates with the RA3 data and EA3 input to ERAT 440.

The next entry in the ERAT 440 cache of translation data is shown as an effective address of EA2. HU 400 uses the effective address EA2 as input to the ERAT 440. The ERAT 440 outputs a real address RA2 data. WIMG bits shown as 0101 represent respectively W, I, M, and G bits. The W bit, corresponding to write-back or write-through status for real address RA2, is a 0 thus designating a write-back. The I bit, corresponding to cache-enabled or cache-inhibited status for RA2, is a 1 thus designating cache-inhibited. The M bit, corresponding to local access or global access for real address RA2, is a 0 thus designating local access. The G bit, corresponding to unguarded or guarded status for real address RA2, is a 1 thus designating guarded status. A RAID assignment of 11, (i.e. 3), associates with the RA2 data and EA2 input to ERAT 440.

The next entry in the ERAT 440 cache of translation data is shown as an effective address of EA1. HU 400 uses the effective address EA1 as input to the ERAT 440. The ERAT 440 outputs a real address RA1 data. WIMG bits shown as 0101 represent respectively W, I, M, and G bits. The W bit, corresponding to write-back or write-through status for real address RA1, is a 0 thus designating a write-back. The I bit, corresponding to cache-enabled or cache-inhibited status for RA1, is a 1 thus designating cache-inhibited. The M bit, corresponding to local access or global access for real address RA1, is a 0 thus designating local access. The G bit, corresponding to unguarded or guarded status for real address RA1, is a 1 thus designating guarded status. A RAID assignment of 01, (i.e. 1), associates with the RA1 data and EA1 input to ERAT 440. In FIG. 6, multiple entries (not shown) represent the entire cache of translation data for effective to real address translator EA 440.

ERAT 440 receives as input the effective address data from EA register 435. During a store request, HU 400 employs effective address translation within the software application operational architecture to generate real addresses. Real addresses relate directly to memory address locations. More particularly, the real address corresponds to a physical memory location outside the HU such as the system memory of an IHS. ERAT 440 typically operates as a lookup table (LUT) using a page table cache of translation data in an associative array as seen in FIG. 6. The effective address (EA) or virtual address represents the input to the ERAT 440 page table cache array. The ERAT 440 page table holds the real address (RA), Size of the data to be written, Data to be written, WIMG bits and resource allocation identifier (RAID) bits that associate with the EA input. The two RAID bits which represent the RAG identifier are resident in ERAT 440. Because the RAID bits are resident in ERAT 440, the HU 400 does not require a RAID register as does HU 300 of FIG. 3. Moreover, in this particular embodiment, HU 400 includes a hypervisor 442, namely a software or firmware layer in HU 400, that assigns the two RAID bits to pages within ERAT 440 thus providing a unique RAID for each instruction during the address translation process that ERAT 440 performs. Hypervisor 442 represents a privileged system software layer that exhibits higher processor system privileges, such as read access and modification rights, than other system software of processor system 100. Hypervisor 442 includes instructions that may execute on an HU. Hypervisor instructions have access to system control facilities such as RAID registers, RAM 110, and address translation tables that ERAT 440 caches. Operating system or supervisor code and application programs typically do not have such access privileges. The hypervisor 442 of processor system 100 does not typically execute directly on SPEs, namely SPE-1 through SPE-8. However, the hypervisor 442 does execute directly on PPE 115 and exhibits the ability to alter system control facilities within the SPEs using mechanisms (not shown). In one embodiment, hypervisor 442 maintains address translation tables for which the ERAT acts as a cache. RAID information associates with the address translation tables that the hypervisor maintains. RAID information is an attribute of a page table entry (PTE) in ERAT 440. I/O interface operations and memory operations operate through ERAT 440 during execution so that both I/O interface operations and memory operations will have a unique resource allocation identifier RAID available. Hypervisor 442 assigns unique RAID bit assignments to each entry of the ERAT 440 cache of translation data. Moreover, hypervisor 442 assigns unique RAID bit assignments to employ different bandwidth allocation rates for each entry and thus instruction within the ERAT 440 cache. The application software that executes within an HU of processor system 500 may interpret the need for specific bus bandwidth allocation rates and further direct the hypervisor 442 to change the RAID bit assignments in ERAT 440 on a per instruction basis.

Each entry in the page table cache of ERAT 440 corresponds to a page table entry PTE. The ERAT 440 page represents the highest order set of bits for the address under translation or effective address (EA). In one embodiment of the disclosed apparatus and method, ERAT 440 translates a 4 K byte effective address (EA) to a real address (RA). In this translation process, ERAT 440 ignores the lower order 12 bits of the effective address EA for translation. More specifically, ERAT 440 interprets the lower order 12 bits of the effective address EA as page offsets wherein the lower order 12 bits of the 4 K byte effective address EA remain intact after translation. The page or upper bits of the EA under translation represent the remaining upper address bits of the effective address EA to real address RA translation.

ERAT 440 stores the WIMG bits as memory address transfer attributes. More specifically, in the embodiment of FIG. 4, ERAT 440 stores WIMG bits as address storage attributes. The WIMG bits determine the manner in which software and hardware in the processor system accesses system memory. The WIMG bits include the W bit that corresponds to write-back or write-through status for the address request. The I bit represents either the cache-enabled or cache-inhibited status of the store request. The M bit represents the local or global access rights of the store request. The G bit corresponds to the guarded or unguarded status of the address store request. The output of ERAT 440 couples to the input of an RA,WIMG, RAID register 445. ERAT 440 generates the physical or real address RA, the set of storage attributes WIMG bits, and RAID bits at its output. The RA,WIMG,RAID register 445 receives as input the output of the effective to real address translator ERAT 440. RA,WIMG,RAID register 445 provides temporary storage for the RA, WIMG and corresponding RAID bits of an instruction that HU 400 executes. The output of RA,WIMG,RAID register 445 couples to the input of a pipelined first in first out (FIFO) store queue 700 of FIG. 7. The (FIFO) store queue 700 receives instruction sequences from RA,WIMG,RAID register 445. HU 400 collects and stores these instruction sequences in the pipelined (FIFO) store queue 700. Moreover, the pipelined instruction (FIFO) store queue 700 holds subsequent instructions from RA,WIMG,RAID register 445. Filling the (FIFO) store queue 700 allows new addresses to translate through ERAT 440 while HU 400 waits for memory bus access on the current instruction. The current instruction resides in the lowermost location of the (FIFO) store queue 700. HU 400 executes the current instruction of a full or partially full (FIFO) store queue 700 and waits for memory or I/O bus access for the current instruction.

The RAID bits in FIFO store queue 700 are two binary bits of data identifying one of four RAGs, namely RAG0, RAG1, RAG2, or RAG3. More particularly, RAG0 to RAG3 correspond directly to the bandwidth allocation rate in RAM 560. The output of FIFO store queue 700 couples to the input of token requestor 460 to provide RAID bit data thereto. HU 400 reads the lowermost entry of FIFO store queue 700 and initiates a request for memory bus access or I/O bus access by sending the RAID bits in FIFO store queue 700 to token requester 460. Subsequently, token requester 460 generates a token request on token request line 465. This token request travels over token request line 465 to resource allocation manager (RAM) 560 as a request for memory bus access or I/O bus access. The token request on line 465 includes the HU 400 RAID bits from RA,WIMG,RAID register 445. RAM 560 receives the token request and evaluates the bandwidth allocation rate for the corresponding HU 400. RAM 560 evaluates the RAID identifier bit of HU 400 against current bandwidth usage and issues a token grant by generating a token grant signal on a token grant line 470 that communicates the token grant back to token requestor 460. RAM 560 generates the token grant when the proper timing and bandwidth analysis within RAM 560 completes.

The output of FIFO store queue 700 couples to one input of a switch 475. If the output of FIFO store queue 700 issues a memory store instruction, i.e. a memory access request to store data, the store request requires the use of the memory bus 530. If the output of FIFO store queue 700 issues an I/O store instruction, the store request requires the use of the I/O bus 535. HU 400 evaluates the output of FIFO store queue 700 to determine which bus, namely memory bus 530 or I/O bus 535 the store request requires. Switch 475 effectively connects and disconnects the output of FIFO store queue 700 to a memory controller 525/system memory bus 530 or I/O controller 520/I/O bus 535 of processor system 500 of the FIG. 5. This switching is under the control of the token requester 460 that couples to switch 475 of HU 400. When token requester 460 receives a token grant signal on token grant line 470 from RAM 560, HU 400 effectively closes switch 475 and initiates the final stages of the store operation. Moreover, HU 400 allows the lowermost entry of FIFO store queue 700 to transfer through switch 475 and access memory bus 530 or I/O bus 535, thus placing the real address and WIMG bits on the memory or I/O bus. Storage data and data size accompany the real address and WIMG bit data.

The methodology disclosed above describes a representative store operation wherein processor system 500 of FIG. 5 employs the specially configured hardware units (HUs) 400 of FIG. 4. While that example involves a store operation, an HU in processor 500 may also execute a load operation using the disclosed methodology. A load operation does not generate write data, but does request read data. During a load operation, processor system 500 does not write data onto the I/O interface bus 535 or into system memory via memory bus 530. The load operation includes two phases. In the first phase of a load operation, the HU 400 initiates a load request and ultimately places a real address on memory bus 530 after effective to real address translation by ERAT 440. In the second phase of the load operation, processor system 500 retrieves the memory data at the specified target address and presents the memory data to the HU on memory bus 530. The load operation then completes. In comparing store operations by HU 400 with load operations by HU 400, the real address, WIMG bits, and RAID bits all play essentially the same role in each of these operations. Thus, the teachings above with respect to the execution of store operations by HU 400 also apply to the load operations that HU 400 executes.

Instruction level bandwidth allocation in the representative HUs 400 of processor system 500 provides the ability to manage multiple applications that each require different respective I/O bus usage rates and/or memory bus access rates. The disclosed methodology is especially useful when multiple operating systems operating on the same HU each require a specific different bandwidth allocation rate per operating system for I/O bus usage and memory bus usage.

FIG. 7 shows a representative configuration of a FIFO store queue 700 for use in HU 400 of FIG. 4. More specifically, FIG. 7 depicts the lowermost 3 store instructions that were temporarily resident in the RA,WIMG,RAID register 445 after ERAT 440 translated these instructions. ERAT 440 translates these store instructions and then places the translated instructions in respective storage locations in FIFO store queue 700 via register 445. FIG. 7 shows the elements of FIFO store queue 700 as real address RA, WIMG bits, instruction data size, storage data, and RAID bits per instruction. A store instruction, namely a store-1 instruction, represents the next instruction to leave FIFO store queue 700 for execution completion by the HU. FIFO store queue 700 contains a real address RA of RA1 for the store-1 instruction. RA1 may represent a 64-bit address wherein the lower 12 bits are identical to the effective address input to ERAT 440. In one embodiment, FIFO store queue 700 may not store these lower 12 bits. The lower 12 bits of the EA and RA represent a 4 KB address page offset. In this example, the remaining upper 52 bits of the 64 bit real address RA, represent the real address RA1 entry. A WIMG bit example shown as 0101 represents respectively W, I, M, and G bits. The WIMG bits are memory address transfer attributes which can affect the way in which hardware units (HUs) access the memory or I/O busses. The W bit, corresponding to write-back or write-through status for real address RA1, is a 0 and thus designate write-back. The I bit, corresponding to cache-enabled or cache-inhibited status for RA1, is a 1 and thus designates cache-inhibited. The M bit, corresponding to local access or global access for real address RA1, is a 0 and thus designates local access. The G bit, corresponding to unguarded or guarded status for real address RA1, is a 1 and thus designates guarded status. In FIG. 7, FIFO store queue 700 shows a representative data size for the instruction store-1 as 4 bytes. The data size for the store operation of store-1 is thus 4 bytes of data. FIFO store queue 700 contains the data for the store operation store-1 shown as D1 and 4 bytes in size in FIG. 7. The store-1 instruction exhibits an associative RAID bit assignment of 01 (i.e. 1). In this example, a RAID assignment of 1 indicates that the store-1 instruction will have a RAG number assignment of 1 and the associative bus bandwidth rate that RAM 560 assigns to RAG1.

As seen in the FIG. 7 representation of FIFO store queue 700, the next instruction in FIFO store queue 700 after the store-1 instruction is a store-2 instruction. FIFO store queue 700 stores a real address RA of RA2 for the store-2 instruction. RA2 may represent a 64-bit address wherein the lower 12 bits are identical to the effective address input to ERAT 440. In one embodiment, FIFO store queue 700 may not store these lower 12 bits. The lower 12 bits of the EA and RA represent a 4 KB address page offset. In this example, the upper 52 bits of the real address RA, represent the real address RA2 entry. A WIMG bit example shown as 1101 represents respectively W, I, M, and G bits. The W bit, corresponding to write-back or write-through status for real address RA2, is a 1 thus designating a write-through operation. The I bit, corresponding to cache-enabled or cache-inhibited status for RA2, is a 1 thus designating cache-inhibited. The M bit, corresponding to local access or global access for real address RA2, is a 0 thus designating local access. The G bit, corresponding to unguarded or guarded status for real address RA2, is a 1 thus designating guarded status. In FIG. 7, FIFO store queue 700 shows a representative size for store-2 instruction as 8 bytes. The data size for the store operation of store-2 is thus 8 bytes of data. FIFO store queue 700 contains the data for the store operation store-2 shown as D2 and 8 bytes in size. A RAID assignment of 11, (i.e. 3), associates with the store-2 instruction. RAM 560 thus assigns the bus bandwidth rate of RAG3 to the store-2 instruction.

The next instruction in FIFO store queue 700 after the store-2 instruction is shown as a store-3 instruction. FIFO store queue 700 stores a real address RA of RA3 for the store-3 instruction in FIG. 7. RA3 may represent a 64-bit address wherein as above, the lower 12 bits are identical to the effective address input to ERAT 440. In one embodiment, FIFO store queue 700 may not store these lower 12 bits. The lower 12 bits of the EA and RA represent a 4 KB address page offset. In this example, the upper 52 bits of the real address RA, represent the real address RA2 entry. A WIMG bit example shown as 0110 represents respectively W, I, M, and G bits. The W bit, corresponding to write-back or write-through status for real address RA3 is a 0, thus designating write-back. The I bit, corresponding to cache-enabled or cache-inhibited status for RA3 is a 1, thus designating cache-inhibited. The M bit, corresponding to local access or global access for real address RA3 is a 1, thus designating global access. The G bit, corresponding to unguarded or guarded status for real address RA3, is a 0 thus designating an unguarded status. In FIG. 7, FIFO store queue 700 shows a representative size for store-3 of 2 bytes. The data size for the store operation of store-3 is 2 bytes of data. FIFO store queue 700 contains the data for the store operation store-3 represented as D3 and as 2 bytes in size. A RAID assignment of 00, (i.e. 0), associates with the store-3 instruction. RAM 560 assigns the bus bandwidth rate of RAG0 to the store-3 instruction thus completing the store instruction data populating FIFO store queue 700. The RAID bit assignments include 0, 1, 2, and 3, wherein a different 2 bit pair corresponds to each RAID bit assignment. The RAID bit assignments directly associate with RAG number assignments RAG0, RAG1, RAG2, and RAG3. In some applications, processor system 500 and HU 400 may employ a smaller number of bits than 2 if a smaller number of RAGs is desirable for a particular application. For example, a single bit field of 0 or 1 may represent two RAGs. In some applications, processor system 500 and HU 400 may employ a larger number of bits than 2 if a larger number of RAGs than four is desirable for a particular application.

Figure 8:
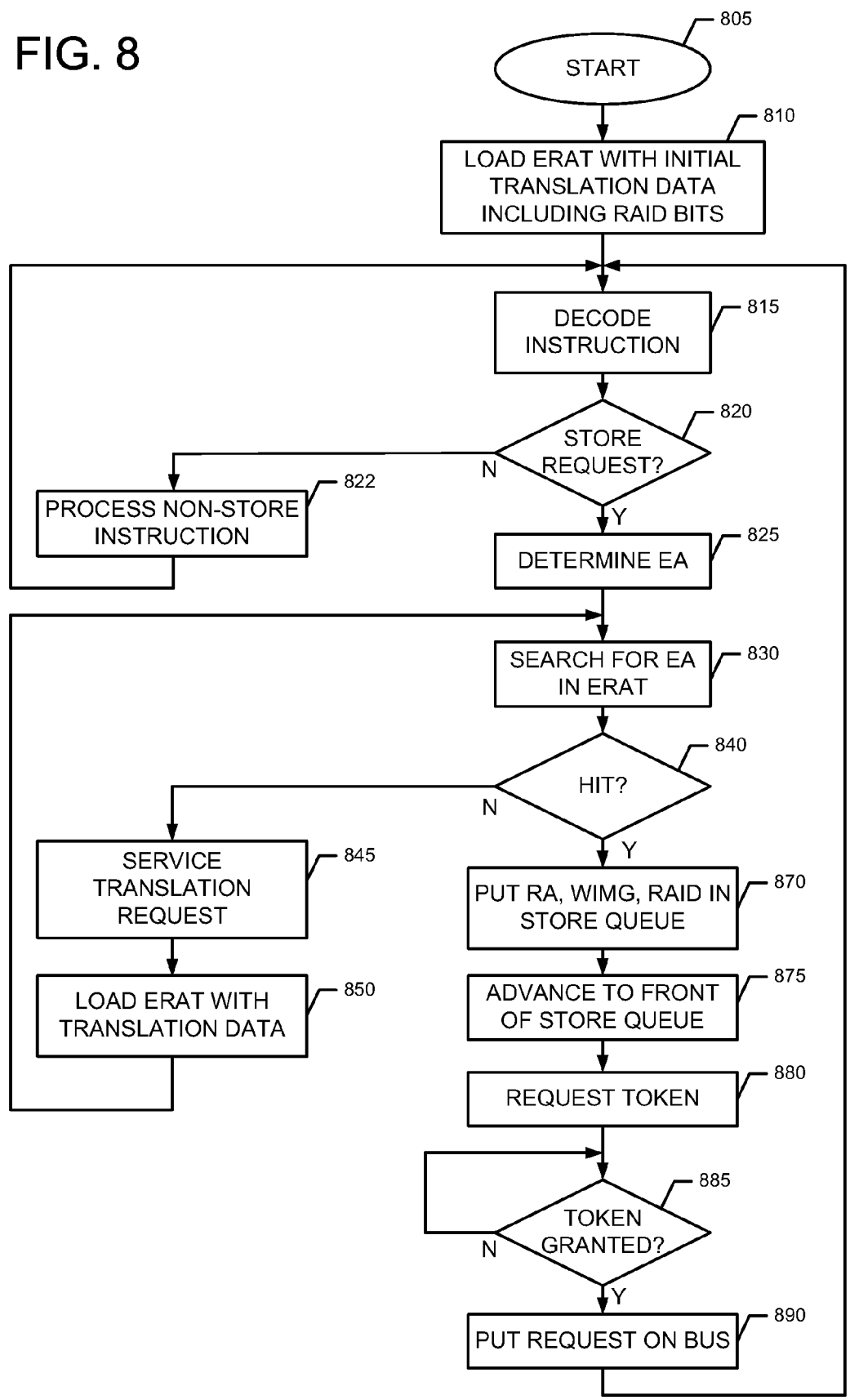
FIG. 8 is a flow chart that depicts the processing of a store request in a processor system using the disclosed methodology.

FIG. 8 is a flow chart that depicts the execution of a store instruction or write instruction by a representative hardware unit (HU) 400 of FIG. 4. The hardware units (HUs) within processor system 500 are capable of executing such a store request. Execution of a store instruction begins at start block 805. Application software that executes on any of the HUs may initiate a store instruction that is also known as a write instruction or a write operation. The hypervisor 442 may load the ERAT 440 indirectly by means of translation tables (not shown), with initial translation data on an instruction by instruction basis with real address RA, WIMG bits, and including resource allocation identification (RAID) bits, as per block 810. Each entry in ERAT 440 contains the instruction which corresponds to the lookup address or effective address EA. An instruction decoder (not shown) in a particular HU decodes an instruction, as per block 815. The instruction decoder or associated hardware in the HU 400 then performs a test to determine if the decoded instruction is a store instruction, i.e. a write request, as per decision block 820. If the test of the decoded instruction returns a false result wherein the decoded instruction is not a store instruction, the non-store instruction executes, as per process non-store instruction block 822. Flow returns to block 815 and the instruction decoder decodes the next instruction. However, if the store instruction test returns a true result at decision block 820, then the HU determines the effective target address of the store instruction, as per determine effective address (EA) block 825. The HU then moves the store instruction data with its effective address to ERAT 440 for evaluation. ERAT 440 converts the effective address (EA) to a corresponding real address (RA) if the EA entry already exists within the effective to real address translator ERAT. More particularly, ERAT 440 uses the effective address (EA) as lookup data in a lookup table LUT, and searches for EA data in ERAT 440, as per block 830. If the ERAT 440 currently stores the EA in its LUT memory, the ERAT 440 outputs the corresponding RA in the LUT memory. This signifies a "hit", or successful translation in decision block 840. However, if the ERAT LUT memory does not contain a value for the particular EA under test, the hit test of decision block 840 returns a false result. In the event of such a no EA hit condition in decision block 840, the HU initiates a service translation request, as per block 845. A service translation request results in the generation of the proper ERAT translation data and loading of that ERAT translation data into the ERAT LUT memory, as per block 850.

Following the successful load of the ERAT LUT memory, the HU again attempts to looks up the EA in ERAT 440, again as per block 830. If the effective address hit test of block 840 returns a true result for the subject store instruction or operation, wherein the ERAT cache contains a match for the EA, the HU transfers the corresponding RA, WIMG bits, and resource allocation identification (RAID) bits for that instruction into FIFO store queue 700, as per block 870. For purposes of this example, block 870 refers to WIMG bits. However, in other implementations of the disclosed methodology, hardware units (HUs) may use additional control bits or fewer control bits than the WIMG example, those control bits corresponding to other address transfer attributes according to the particular application.

In one embodiment, HU 400 loads the FIFO store queue 700 with instructions and executes each instruction in the order in which the instructions load, For example, in FIG. 7, the lowermost instruction store-1 is the next in queue instruction to execute. After the store-1 instruction executes, the store-2 instruction moves into the lowermost location in FIFO store queue 700 and becomes the next instruction to execute. The store-3 instruction moves lower in the store queue and new instructions enter the uppermost locations of the store queue. Returning to the flowchart of FIG. 8 the next in queue instruction is the lowermost entry of FIFO store queue 700. HU 400 advances to front of FIFO store queue 700, as per block 875. HU 400 then initiates a token request or requests a token, as per block 880. More particularly, token requester 460 of HU 400 requests a token from the resource allocation manager (RAM) 560, namely to request the use of the memory bus 530 or I/O interface bus 535 for the store operation. HU 400 waits until RAM 560 grants a token request before continuing the store instruction operation. Token requestor 460 tests to determine if RAM 560 responds by granting a token, as per token granted decision block 885. If the token granted test returns a false result, HU 400 maintains a hold and watch status, as per decision block 885. However, if the token granted test returns a true result, HU 400 puts the store request data on memory bus 530 or I/O interface bus 535, as appropriate per block 890. In the case of a memory store operation, memory bus 530 then transfers the store request data to system memory for storage therein. The HU may also request an I/O interface bus 535 transfer in the same manner as above. In that case, the HU would put the resultant I/O data on the I/O interface bus 535 through the I/O interface controller 520. Thus, the "put request on bus" block 890 applies to both placing data resulting from a store instruction on the memory bus 165 and also to placing data resulting from an I/O request instruction on I/O bus 535. Finally, following the successful store instruction operation, the HU 400 decodes the next instruction and operational flow continues, as per block 815. The example shown in FIG. 8 depicts a representative store or write operation of processor system 100. Another type of operation that demonstrates the effectiveness of the embodiment shown is the load or read operation. Although variations in store and load of data namely read or write of data on the bus represents differences between the two operation types, the mechanism and methodology shown in FIG. 8 represents the same basic elements of that structure. Moreover, the special use of RAID bits represents a common element between load and store operations.

Figure 9:
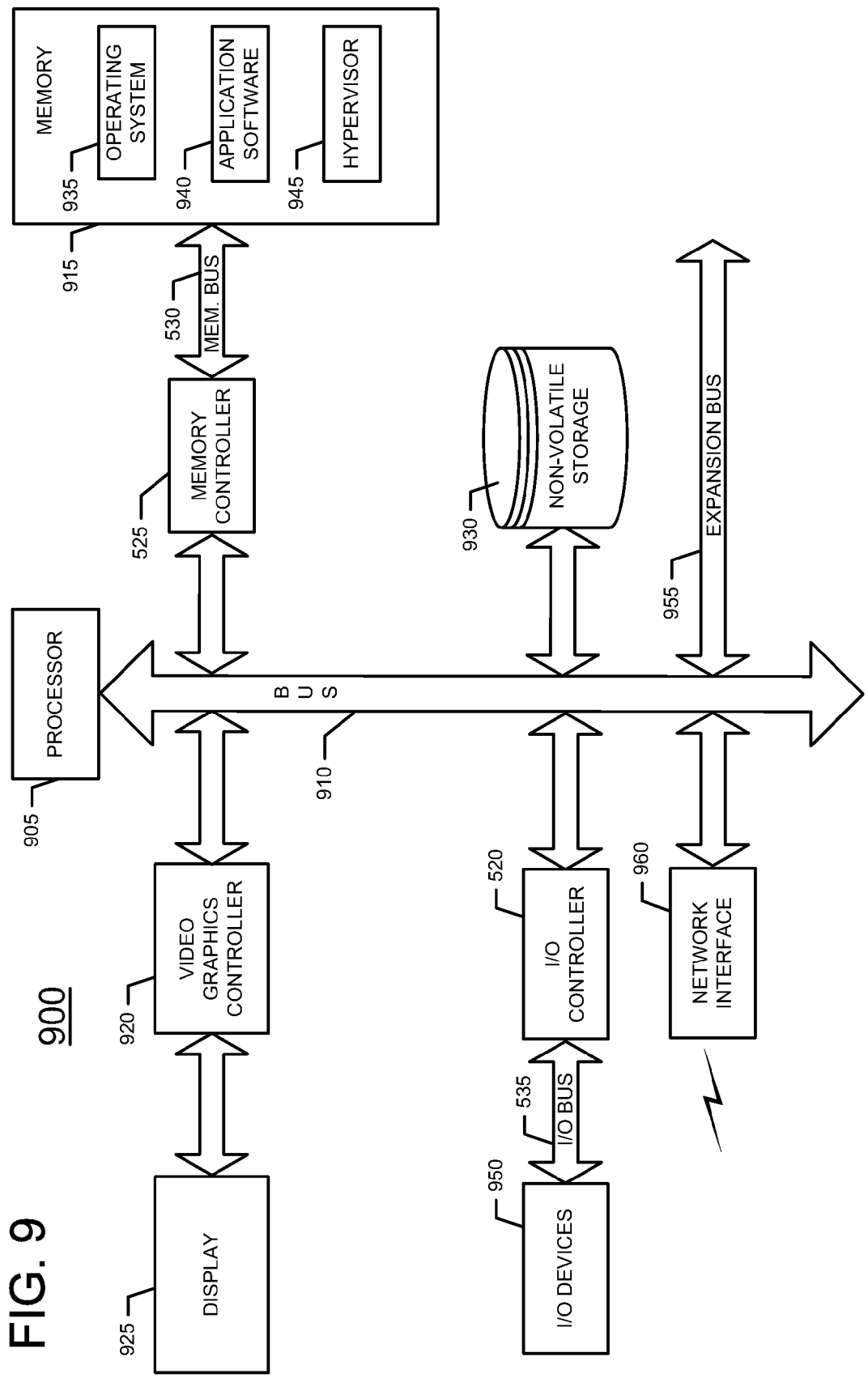
FIG. 9 is a block diagram of an information handling system employing the disclosed resource allocation methodology.

FIG. 9 shows a simplified block diagram of a representative information handling system (IHS) 900 that employs a processor 905. In one embodiment, processor 905 is processor system 500 that includes HUs 400. IHS 900 further includes a bus 910 that couples processor 905 to memory controller 525 and video graphics controller 920. More particularly, system memory bus 530 couples to system memory 915 as shown. In actual practice, bus 910 may include multiple buses, for example a memory bus and an I/O bus. A display 925 couples to video graphics controller 920. Nonvolatile storage 930, such as a hard disk drive, CD drive, DVD drive, or other nonvolatile storage couples to bus 910 to provide IHS 900 with permanent storage of information. An operating system 935 loads in memory 915 to govern the operation of IHS 900. Other system software, namely application software 940 and hypervisor 945, reside in memory 915 to further govern operations of IHS 900. I/O devices 950, such as a keyboard and a mouse pointing device, couple via I/O bus 535 and I/O controller 520 to bus 910. One or more expansion busses 955, such as USB, IEEE 1394 bus, ATA, SATA, PCI, PCIE and other busses, couple to bus 910 to facilitate the connection of peripherals and devices to IHS 900. A network interface adapter 960 couples to bus 910 to enable IHS 900 to connect by wire or wirelessly to a network and other information handling systems. While FIG. 9 shows one IHS that employs processor system 500 as processor 905, the IHS may take many forms. For example, IHS 900 may take the form of a desktop, server, portable, laptop, notebook, or other form factor computer or data processing system. IHS 900 may take other form factors such as a gaming device, a personal digital assistant (PDA), a portable telephone device, a communication device or other devices that include a processor and memory.

The foregoing discloses a processor system and methodology that may provide memory bus and I/O interface bus bandwidth improvements. In one embodiment, the processor system may allocate memory bus and/or I/O bus bandwidth on a per instruction or per request basis.

Modifications and alternative embodiments of this invention will be apparent to those skilled in the art in view of this description of the invention. Accordingly, this description teaches those skilled in the art the manner of carrying out the invention and is intended to be construed as illustrative only. The forms of the invention shown and described constitute the present embodiments. Persons skilled in the art may make various changes in the shape, size and arrangement of parts. For example, persons skilled in the art may substitute equivalent elements for the elements illustrated and described here. Moreover, persons skilled in the art after having the benefit of this description of the invention may use certain features of the invention independently of the use of other features, without departing from the scope of the invention.

What is claimed is:

1. A method of accessing a shared resource by a multi-core processor including a plurality of hardware unit (HU) cores, the method comprising:
  receiving, by a particular hardware unit (HU) core of a plurality of hardware unit (HU) cores in the processor, an instruction for execution that calls for an access request to the shared resource;
  grouping, by the processor, the plurality of HU cores into a plurality of resource allocation groups (RAGs), each RAG including at least one HU core, each RAG being dynamically assigned a respective bandwidth allocation rate with respect to access to the shared resource; and
  associating resource allocation identification (RAID) information with the instruction as it passes through a plurality of pipelined stages in an instruction handler in the particular HU core, the RAID information indicating to which particular resource allocation group (RAG) the particular HU core belongs, the RAID information accompanying the instruction from pipelined stage to pipelined stage in the particular HU core, the RAID information in the particular HU core being changeable on the fly on an instruction by instruction basis to designate the RAG and respective bandwidth allocation rate associated with the instruction;

wherein one of the pipelined stages is an address translation pipelined stage that performs effective address to real address translation for the instruction, the resource allocation identification (RAID) information being resident in the address translation pipelined stage;

wherein one of the pipelined stages in the instruction handler is a store queue, the store queue receiving the instruction and associated resource allocation identification (RAID) information after address translation by the address translation pipelined stage; and wherein one of the pipeline stages in the instruction handler is a token requester that receives directly from the store queue the resource allocation identification (RAID) information that is associated with the instruction, such that the token requester may request a different resource allocation from a resource allocation manager on an instruction by instruction basis.

2. The method of claim 1, wherein the providing step comprises providing, by a hypervisor that executes in the particular HU core, the resource allocation identification (RAID) information.

3. The method of claim 1, wherein an access requestor in the particular HU core transmits an access request for access to the shared resource to a resource allocation manager, the resource allocation manager being external to the particular HU core and communicating with the plurality of HU cores of the processor, the access requestor transmitting an access request on an instruction by instruction basis for instructions and associated resource allocation identification (RAID) information in the store queue, thus providing access requests that include resource allocation identification (RAID) information of respective instructions in the store queue.

4. The method of claim 3, further comprising allocating, by the resource allocation manager, bandwidth of the shared resource to the access request based on the resource allocation identification (RAID) information in the access request.

5. The method of claim 1, wherein the access request is one of a memory access request and an I/O access request.

6. The method of claim 1, wherein the shared resource is one of a memory and an I/O device.

7. A multi-core processor comprising:
a plurality of hardware unit (HU) cores, situated on a semiconductor die, the plurality of HU cores being configured to access a shared resource, the plurality of HU cores including a particular HU core wherein the processor groups the plurality of HU cores into a plurality of resource allocation groups (RAGs), each RAG including at least one HU core, each RAG being dynamically assigned a respective bandwidth allocation rate with respect to access to the shared resource;
the particular HU core including a plurality of pipelined stages, wherein the particular HU core receives an instruction for execution that calls for an access request to the shared resource;
wherein the processor associates resource allocation identification (RAID) information with the instruction as it passes through the plurality of pipelined stages in an instruction handler in the particular HU core, the RAID information indicating to which particular resource allocation group (RAG) the particular HU core belongs, the RAID information accompanying the instruction from pipelined stage to pipelined stage in the particular HU core, the RAID information in the particular HU core being changeable on the fly on an instruction by instruction basis to designate the RAG and respective bandwidth allocation rate associated with the instruction;

wherein one of the pipelined stages is an address translation pipelined stage that performs effective address to real address translation for the instruction, the resource allocation identification (RAID) information being resident in the address translation pipelined stage and being associated with the instruction at the address translation pipelined stage;

wherein one of the pipelined stages in the instruction handler of the particular HU core is a store queue, the store queue receiving the instruction and associated resource allocation identification (RAID) information after address translation by the address translation pipelined stage;

wherein one of the pipeline stages in the instruction handler is a token requester that receives directly from the store queue the resource allocation identification (RAID) information that is associated with the instruction, such that the token requester may request a different resource allocation from a resource allocation manager on an instruction by instruction basis.

8. The processor system of claim 7, wherein the particular HU core executes a hypervisor that provides the resource allocation identification (RAID) information to the instruction.

9. The processor system of claim 7, wherein the particular HU core includes an access requestor that transmits an access request for access to the shared resource to a resource allocation manager, the resource allocation manager being external to the particular HU core and being coupled to the plurality of HU cores of the processor, the access requestor transmitting an access request on an instruction by instruction basis for instructions and associated resource allocation identification (RAID) information in the store queue, thus providing access requests that include resource allocation identification (RAID) information of respective instructions in the store queue.

10. The processor system of claim 9, wherein the resource allocation manager allocates bandwidth of the shared resource to the access request based on the resource allocation identification (RAID) information in the access request.

11. The processor system of claim 7, wherein the access request is one of a memory access request and an I/O access request.

12. The processor system of claim 7, wherein the shared resource is one of a memory and an I/O device.

13. An information handling system comprising:
a shared resource; and
a processor coupled to the shared resource, the processor including a plurality of hardware unit (HU) cores that access the shared resource, the plurality of HU cores including a particular HU core wherein the processor groups the plurality of HU cores into a plurality of resource allocation groups (RAGs), each RAG including at least one HU core, each RAG being dynamically assigned a respective bandwidth allocation rate with respect to access to the shared resource;
the particular HU core including a plurality of pipelined stages, wherein the particular HU core receives an instruction for execution that calls for an access request to the shared resource;
wherein the processor associates resource allocation identification (RAID) information with to the instruction as it passes through the plurality of pipelined stages in an instruction handler in the particular HU core, the RAID information indicating to which particular resource allocation group (RAG) the particular HU core belongs, the RAID (RAID) information accompanying the instruction from pipelined stage to pipelined stage in the particular HU core, the RAID information in the particular HU core being changeable on the fly on an instruction by instruction basis to designate the RAG and respective bandwidth allocation rate associated with the instruction;

wherein one of the pipelined stages is an address translation pipelined stage that performs effective address to real address translation for the instruction, the resource allocation identification (RAID) information being resident in the address translation pipelined stage and being associated with the instruction at the address translation pipelined stage;

wherein one of the pipelined stages in the instruction handler of the particular HU core is a store queue, the store queue receiving the instruction and associated resource allocation identification (RAID) information after address translation by the address translation pipelined stage;

wherein one of the pipeline stages in the instruction handler is a token requester that receives directly from the store queue the resource allocation identification (RAID) information that is associated with the instruction, such that the token requester may request a different resource allocation from a resource allocation manager on an instruction by instruction basis.

\* \* \* \* \*